3,030,382
PRODUCING VINYLENE CARBONATE

Tad Le Marre Patton, Houston, Tex., assignor to Monsanto Chemical Company, St. Louis, Mo., a corporation of Delaware
No Drawing. Filed Dec. 22, 1953, Ser. No. 399,828
14 Claims. (Cl. 260—340.2)

This invention relates to producing vinylene carbonate.

Vinylene carbonate is described by Newman and Addor, Jour. Amer. Chem. Soc., 75, 1263, March 5, 1953. It is a useful monomer and as such is used as starting material in homopolymerizations and copolymerizations. It forms Diels-Alder adducts and enters into various other reactions.

The present invention produces vinylene carbonate by the vapor phase dehydrochlorination of monochloroethylene carbonate. The reaction is

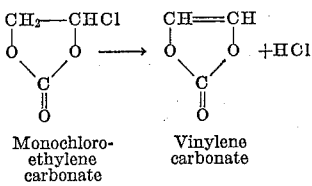

Monochloro-   Vinylene
ethylene      carbonate
carbonate

The reaction proceeds very easily by subjecting monochloroethylene carbonate in vapor phase to pyrolysis, either in the absence or presence of catalysts.

Temperatures within a broad range can be used, and will be chosen in relation to the flow rate, absence or presence of catalysts, absence or presence of diluent, and pressure. In most instances a temperature of at least 100° C. is required, and in any event it should be sufficiently high to produce vinylene carbonate and should not reach the temperature at which, under the combination of other reaction variables employed, no vinylene carbonate product is recovered because of decomposition of starting material or desired product or other side reactions. Temperatures within the range of 200 to 450° C. are preferred.

The vapor phase dehydrochlorination reaction can be effected at sub-atmospheric, atmospheric or super-atmospheric pressures. Pressures well above atmospheric, for example above 50 pounds per square inch absolute, tend to decrease the yield. It is preferred that the partial pressure of monochloroethylene carbonate starting material not exceed atmospheric pressure in the reaction zone. The sole feed to the reaction can be monochloroethylene carbonate, or there can be admixed therewith normally gaseous or normally liquid inert diluent or carrier materials which serve to reduce the partial pressure of the reactant and products and to sweep the reaction mixture through the reaction zone. Such carriers can be, for example, inert gases, such as nitrogen, methane, or carbon dioxide. Suitable normally liquid carriers are inert solvents such as hexane, benzene and toluene. The quantity of carrier can advantageously be within the range of 0 to 5 moles carrier per mole of monochloroethylene carbonate, although larger quantities can also be used.

The reaction time allowed will of course be dependent upon the other reaction variables, particularly temperature and catalyst. The most convenient procedure is to pass a gaseous stream comprising monochloroethylene carbonate through a reaction zone, maintained at desired reaction conditions, in a continuous manner. Flow rates will generally be within the range of 50 to 500 moles monochloroethylene carbonate per cubic foot of reaction zone per hour, when the reaction zone contains either catalyst or inert packing of the nature of beads of glass, fused silica, fused alumina and the like employed for heat transfer purposes.

Those skilled in the art, having had the benefit of the present disclosure, can readily choose suitable combinations of reaction conditions producing good yields of vinylene carbonate product.

While the reaction can be effected in the absence of any catalyst, it is preferred to employ a solid dehydrochlorination catalyst effective under the particular conditions of use to produce vinylene carbonate. A preferred catalyst is calcium sulfate. As other suitable catalysts can be mentioned, by way of example, calcium carbonate, dolomite, magnesium carbonate, calcium phosphate, magnesium phosphate, lead oxide, magnesium chloride, calcium chloride. In most instances it is preferred that the catalysts have a relatively low surface area, e.g., not in excess of 50 square meters per gram as determined by conventional low temperature nitrogen adsorption procedure. The catalyst is most conveniently employed in pelleted form, and in preparing such catalysts any of the well-known commercial procedures, including those employing added binders, fillers and the like which aid the formation of pellets, beads or other shaped forms, is permissible. For a fixed bed of catalyst a mesh size within the range of 4 to 20 mesh is usually most advantageous. Rather than a fixed bed of catalyst through which the gaseous reaction mixture flows, finely powdered catalyst can be used in suspension in the gaseous reaction mixture. Preferably such a catalyst is employed in the form of a so-called "fluidized bed," wherein a body of the powdered catalyst is maintained in continuous turbulent motion by passage upwardly therethrough of the gaseous reaction mixture at a rate maintaining the appearance of a boiling liquid and the presence of a definitely discernible upper surface of the fluidized catalyst bed.

After a period of use, the solid dehydrochlorination catalyst can be regenerated by contact with an oxygen-containing gas, such as pure oxygen or preferably air, at a temperature sufficiently elevated to remove carbonaceous deposits and re-establish the catalytic activity. Such temperature will of course be somewhat dependent upon the particular catalyst used, but will generally be within the range of 500 to 750° C.

Gaseous effluent from the reaction zone is cooled to a temperature sufficiently low to condense all but normally gaseous material. The resulting liquid condensate is then subjected to ordinary distillation procedure for recovering the desired vinylene carbonate product. Unreacted monochloroethylene carbonate is recovered from the distillation and recycled to the reaction. If desired, the reaction effluent can be subjected to scrubbing with a liquid solvent selective for vinylene carbonate or monochloroethylene carbonate, or merely adequate for separating normally liquid materials from gaseous materials. The normally gaseous material obtained from the reaction zone effluent contains hydrogen chloride formed by the dehydrochlorination reaction. It is obvious that this hydrogen chloride can be recovered and by the Deacon process converted to elemental chlorine which can then be reacted with ethylene carbonate to produce monochloroethylene carbonate starting material.

Although the monochloroethylene carbonate employed in the present reaction can be obtained from any source, a convenient method is to subject ethylene carbonate, which is readily available commercially, to direct reaction with elemental chlorine, preferably in the presence of ultraviolet light, and recover monochloroethylene carbonate from the chlorination products.

The following examples illustrate some combinations of reaction conditions and procedures suitable for the practice of the invention. It will be understood, of course, that the invention is not limited to the exact materials and details given therein.

EXAMPLE 1

The reaction system included a vertical externally heated glass tube 36 inches long by ⅞ inch inside diameter, into the top of which the starting material was dropped. The entire system was maintained under vacuum. Material flowing from the bottom of the tube passed first through a water-cooled condenser and thence into a flask cooled externally by Dry Ice (solid $CO_2$). The flask was vented through a water-cooled condenser to a vacuum pump.

Monochloroethylene carbonate (1 mole) in 100 ml. of dry toluene was added dropwise over a period of 30 minutes to the reaction tube or column, which was filled with glass Raschig rings in order to aid heat transfer. The reaction column was maintained at 60 to 80 mm. pressure and 400 to 425° C. The pyrolysate yielded, after removal of toluene, 5 grams of a material boiling at 60 to 68° C. at 18 mm. Hg pressure, and 62 grams of untreated monochloroethylene carbonate. The material boiling at 60–68° C. at 18 mm. was subjected to redistillation, from which was obtained 3 grams of a fraction boiling at 60–62° C. at 18 mm. pressure and having a refractive index $n_D^{25}$ of 1.4220. This fraction comprised the vinylene carbonate product.

The last mentioned fraction was subjected to Diels-Alder reaction with hexachlorocyclopentadiene. The adduct, after being first recrystallized from hexane, melted at 233–234° C. (dec.). A mixed melting point with a sample of vinylene carbonate-hexachlorocyclopentadiene adduct obtained from vinylene carbonate prepared by the amine dehydrochlorination procedure of Newman and Addor, Jour. Amer. Chem. Soc., 75, 1263, March 5, 1953, gave no depression.

EXAMPLE 2

A reaction system similar to that described in Example 1 was used. Instead of glass rings the reaction tube was filled with 8-mesh calcium sulfate particles. The results of two runs are given in Table I. Pure monochloroethylene carbonate was dropped into the top of the reaction tube in these runs, with no added gaseous or liquid inert diluent being employed. In run No. 1, a total of one-half mole monochloroethylene carbonate was fed, while in run No. 2 the amount was one mole.

Table I

| Run No. | Temp. (° C.) | Pressure (mm. Hg) | Rate [1] (mole/min.) | Yield of Vinylene Carbonate [2] (Percent) |
|---|---|---|---|---|
| 1 | 340 | 28–150 | 0.020 | 37.2 |
| 2 | 325 | 23–25 | 0.007 | 19.1 |

[1] Rate at which monochloroethylene carbonate was dropped into the hot tube.
[2] Yield is moles of vinylene carbonate product per mole of monochloroethylene carbonate reacted (destroyed).

EXAMPLE 3

The same procedure given in the preceding examples was used, with the exception that the catalyst was calcium chloride. Data are given in Table II.

Table II

| Run No. | Temp. (° C.) | Pressure (mm. Hg) | Feed Rate (mole/min.) | Carrier (100 ml./Mole) | Vinylene Carbonate [1] Conv. (Percent) | Yield (Percent) |
|---|---|---|---|---|---|---|
| 1 | 300–320 | 25–30 | .0167 | Toluene | 9.3 | 15.8 |
| 2 | 320–350 | 25–30 | .0125 | None | 2.5 | 4.0 |

[1] Conversion is moles vinylene carbonate per mole monocholroethylene carbonate feed. Yield is moles vinylene carbonate per mole monochloroethylene carbonate reacted.

EXAMPLE 4

By procedures described in the preceding examples, employing 8-mesh calcium sulfate as catalyst, the following results were obtained in the pyrolysis of monochloroethylene carbonate to form vinylene carbonate. The results are given in Table III.

Table III

| Run No. | Temp. (° C.) | Pressure (mm. Hg) | Rate [1] (mole/min.) | Carrier (100 ml./mole) | Vinylene Carbonate Conv. (percent) | Yield (percent) |
|---|---|---|---|---|---|---|
| 1 | 260–270 | 65–70 | 0.011 | Toluene | 44.2 | 50.3 |
| 2 | 200 | 65 | 0.011 | Toluene | 7.0 | 21.0 |

[1] Rate at which monochloroethylene carbonate was dropped into the hot tube.

EXAMPLE 5

By the procedures described in the preceding examples, monochloroethylene carbonate was dehydrochlorinated in the vapor phase, in the presence of 8-mesh calcium sulfate catalyst. The reaction was effected at atmospheric pressure. The results are given in the following table.

Table IV

| Run No. | Temp. (° C.) | Pressure | Feed Rate (mole/min.) | Diluent | Vinylene Carbonate Conv. (percent) | Yield (percent) |
|---|---|---|---|---|---|---|
| 1 | 250–270 | Atm. | 0.011 | Nitrogen.[1] | 29 | 34.7 |
| 2 | 200–240 | Atm. | 0.0166 | None | 11 | 13.2 |
| 3 | 225–230 | Atm. | 0.0166 | Nitrogen.[2] | 17.5 | 17.4 |

[1] 45 liters/hour.
[2] 168 liters/hour.

While the invention has been described with particular reference to various preferred embodiments thereof, it will be appreciated that variations from the details given herein can be effected without departing from the invention in its broadest aspects.

I claim:

1. A process which comprises the vapor phase dehydrochlorination of monochloroethylene carbonate at an elevated temperature to produce vinylene carbonate.

2. A process which comprises pyrolyzing monochloroethylene carbonate in the vapor phase at a temperature of at least 100° C. and such as to produce vinylene carbonate as a product of the process.

3. A process which comprises passing a gaseous stream comprising monochloroethylene carbonate at an elevated temperature and in contact with a solid dehydrochlorination catalyst effective to produce vinylene carbonate.

4. A process which comprises passing a gaseous stream comprising monochloroethylene carbonate mixed with an inert diluent at an elevated temperature and in contact with a solid dehydrochlorination catalyst effective to produce vinylene carbonate.

5. A process which comprises the vapor phase dehydrochlorination of monochloroethylene carbonate at an elevated temperature and at a partial pressure not greater than atmospheric and in the presence of a low surface area solid dehydrochlorination catalyst effective to produce vinylene carbonate.

6. Process according to claim 5 effected in the presence of a normally gaseous inert carrier.

7. Process according to claim 5 effected in the presence of a vaporized normally liquid inert carrier.

8. A process which comprises the vapor phase dehydrochlorination of monochloroethylene carbonate at an elevated temperature in the presence of a calcium sulfate catalyst to produce vinylene carbonate.

9. A process which comprises the vapor phase dehydrochlorination of monochloroethylene carbonate at an elevated temperature in the presence of a calcium chloride catalyst to produce vinylene carbonate.

10. A process which comprises the vapor phase dehydrochlorination of monochloroethylene carbonate at a temperature within the range of 200 to 450° C. to produce vinylene carbonate.

11. A process which comprises the vapor phase dehydrochlorination of monochloroethylene carbonate in the presence of a calcium sulfate catalyst and at a temperature within the range of 250 to 350° C. to produce vinylene carbonate.

12. A process which comprises heating monochloroethylene carbonate under reduced pressure to produce vinylene carbonate.

13. A process which comprises heating monochloroethylene carbonate at a temperature of at least 100° C. under reduced pressure to produce vinylene carbonate.

14. A process which comprises heating monochloroethylene carbonate at a temperature in the range of 200 to 450° C. under reduced pressure to produce vinylene carbonate.

References Cited in the file of this patent

UNITED STATES PATENTS

| | | |
|---|---|---|
| 2,204,565 | Britton et al. | June 18, 1940 |
| 2,265,312 | Quattlebaum et al. | Dec. 9, 1941 |
| 2,288,580 | Baehr | June 30, 1942 |
| 2,376,067 | Long | May 15, 1945 |
| 2,430,897 | Van Atta | Nov. 18, 1947 |
| 2,564,035 | Seon et al. | Aug. 14, 1951 |

OTHER REFERENCES

Newman et al.: J.A.C.S., 75, pages 1263–4 (May 5, 1953).